United States Patent [19]

Ohnaga et al.

[11] Patent Number: 6,143,826
[45] Date of Patent: *Nov. 7, 2000

[54] POLYMER BLEND

[75] Inventors: Takashi Ohnaga; Katsunori Takamoto, both of Tsukuba; Yukihiro Fujieda, Iwama-machi; Katsuei Takahashi; Kenichi Hamada, both of Tsukuba, all of Japan

[73] Assignee: Kuraray Co., Ltd., Kurashiki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,599

[22] Filed: Sep. 24, 1997

[30] Foreign Application Priority Data

Sep. 30, 1996 [JP] Japan ...................................... 8-278700
Sep. 3, 1997 [JP] Japan ...................................... 9-254183

[51] Int. Cl.⁷ ..................................................... C08L 53/00
[52] U.S. Cl. .............................. 525/93; 525/92 L; 525/94
[58] Field of Search ..................................... 525/92 L, 92, 525/95, 96, 98, 93, 94

[56] References Cited

U.S. PATENT DOCUMENTS 4,319,002  3/1982  Witschard .................................. 525/71
4,424,303  1/1984  Liu ............................................ 525/67
5,200,492  4/1993  Ohnaga et al. ............................ 428/64
5,306,778  4/1994  Ishida et al. ............................. 525/310

FOREIGN PATENT DOCUMENTS 40 10 511   10/1990   Germany .
61-43643     3/1986   Japan .
95/31503    11/1995   WIPO .

Primary Examiner—Paul R. Michl
Attorney, Agent, or Firm—Oblon, Spivak, McClelland, Maier & Neustadt, P.C.

[57] ABSTRACT

A polymer blend comprising:

(A) an acrylic resin;
(B) a block copolymer consisting essentially of a polymer block of a polymerized aromatic vinyl compound and/or a polymer block of a polymerized methacrylate monoester and a polyolefin polymer block; and
(C) a polymer miscible with the acrylic resin (A) and immiscible with the block copolymer (B), wherein the absolute value ($|\eta_{AC}-\eta_B|$) of the difference between the refractive index ($\eta_{AC}$) of the blend of the acrylic resin (A) and the polymer (C) and the refractive index ($\eta_B$) of the block copolymer (B) is 0.01 or less. This polymer block has excellent transparency, softness and other properties.

18 Claims, No Drawings

POLYMER BLEND

BACKGROUND OF THE INVENTION

1. Field of the Invention

The present invention relates to a polymer blend; more specifically, the present invention relates to a polymer blend with excellent transparency and softness in addition to excellent properties such as processability, weatherability, color developing property and colorability.

2. Description of the Background Art

Olefin polymers such as olefin resins and olefin elastomers show excellent moldability and softness, and by advantageously utilizing these properties, these polymers are commonly used as molding materials, singly or in combination with other thermoplastic resins, thermoplastic elastomers and softening agents by blending the thermoplastic resins, thermoplastic elastomers and softening agents with the polymers. Molded articles produced from olefin polymers include for example automobile bumpers and console panels. Because these olefin polymers do not contain any polar group, however, these polymers are poor in terms of coatability, printability and color developing property during coloring, so that colors and patterns are selected from a narrow range when these polymers are subjected to molding and post-treatment after molding. In other words, currently, the colors and patterns therefor are not freely selected. Although olefin polymers have softness, the surface hardness thereof is adversely so low that the polymers are poor in terms of resistance to scuffing. Because olefin polymers are thermoplastic and can therefore be recycled, however, it is desirable to promote the active use of olefin polymers while improving the drawbacks thereof as described above, from the respect of the current environmental circumstance where great significance is put to materials to be recycled.

Acrylic resins representatively illustrated by methacrylic resin can be recycled, because the resins are excellent in terms of properties including transparency, color developing property, weatherability, and surface hardness and can be decomposed as monomers on heating. Therefore, the acrylic resins are put to a variety of uses primarily including molding materials, for example, a variety of molded articles, window glass and covers of florescent tube, which are frequently used outdoors. However, acrylic resins with low impact resistance are generally poor in terms of softness, so it is desired to improve these properties of the resins.

As resin materials satisfying the demands for properties such as transparency, impact resistance and color developing property at some degree, ABS resin and impact resistant acrylic resins are known, but these resins have poor weatherability because diene rubber with an unsaturated bond in the primary chain thereof is used to improve impact resistance. As resin materials with improved weatherbility, alternatively, AES resin (A/EPDM/S copolymer) and acrylic resins with acrylate ester rubber dispersed therein are known. From the respect of the balance between demands for resin properties and cost, however, these resin materials have only limited utilities, essentially.

Because vinyl chloride polymers are inexpensive and adjustable of their hardness and mechanical properties, depending on the amount of a plasticizer to be blended therein, the polymers are widely used both in the field demanding high surface hardness and transparency like those of acrylic resins and in the field demanding low surface hardness and softness like those of olefin polymers. However, vinyl chloride polymers of themselves have so poor processability that the polymers are molded by using a vast amount of plasticizers. Therefore, the polymers have a serious problem in that the plasticizers used in the molded articles may bleed out onto the surface of the articles. Because vinyl chloride polymers are decomposed on heating to generate hazardous halogen containing compounds, the polymers can hardly be recycled, which currently involves serious concerns about the disposal management of waste plastics containing vinyl chloride polymers.

SUMMARY OF THE INVENTION

In such circumstances described above, Ogawa et al. have made various research works, focusing their attentions on such an idea that a polymer material should be produced from a fine complex of an acrylic resin and an olefin resin, having excellent properties of acrylic resins, such as transparency, surface hardness, weatherbility, and color developing property, as well as excellent properties of olefin resins, such as processability, low-temperature properties and softness, and having high possibility of recycling with no generation of hazardous gases on heating.

Consequently, Ogawa et al. have found that a thermoplastic resin blend produced by blending into an acrylic resin a specific block copolymer consisting essentially of a polymer block of a polymerized aromatic vinyl compound and a hydrogenated isoprene polymer block or a hydrogenated isoprene/butadiene polymer block, which is preliminarily prepared in the form of an olefin polymer through hydrogenation, exerts good softness and excellent processability, weatherability, transparency, dynamic properties, colorability and color developing property, with a higher surface hardness and good recycling potential. Then, an application thereof has been submitted (Japanese Patent Laid-open No. Hei 5-295216 and Japanese Patent Laid-open No. Hei 6-329865).

Furthermore, the inventors of this invention have made investigations to generate a more excellent polymer blend on the basis of the inventions disclosed in Japanese Patent Laid-open Nos. Hei 5-295216 and Hei 6-329865. Consequently, the inventors have found that a thermoplastic polymer blend produced by blending into an acrylic resin a block copolymer consisting essentially of at least one member selected from the group consisting of a polymer block of a polymerized aromatic vinyl compound and a polymer block of a polymerized methacrylate monoester and an olefin polymer block and further making the resulting polymer blend contain a specific polymer miscible with the acrylic resin and immiscible with the block copolymer shows excellent properties including processability, weatherability, mechanical properties, surface hardness, recycling potential, color developing property and colorability like the inventions of Japanese Patent Laid-open No. Hei 5-295216 and Hei 6-329865 and far more excellent transparency than those in the aforementioned inventions, from which a transparent molded article can be produced with no occurrence of white line, having good processability, weatherability, mechanical properties, surface hardness, recycling potential, color developing property and colorability with no occurrence of hazing, irrespective of the molding method whether the method is extrusion molding or injection molding. Thus, the invention has been achieved.

More specifically, the present invention is a polymer blend with good softness, comprising
(A) an acrylic resin;
(B) a block copolymer consisting essentially of a polymer block of a polymerized aromatic vinyl compound and/or a polymer block of a polymerized methacrylate monoester and a polyolefin polymer block; and (C) a polymer miscible with the acrylic resin (A) and immiscible with the block copolymer (B), wherein the absolute value ($|\eta_{AC}-\eta_B|$) of the difference between the refractive index ($\eta_{AC}$) of the blend of the acrylic resin (A) and the polymer (C) which blend lacks the block copolymer (B) in comparison with the polymer blend and the refractive index ($\eta_B$) of the block copolymer (B) is 0.01 or less.

DETAILED DESCRIPTION OF THE INVENTION

The acrylic resin (A) to be used in the polymer blend in accordance with the present invention is an acrylic resin with a principal structural unit derived from an alkyl ester of acrylic acid or methacrylic acid. From the respect of imparting the polymer blend of the present invention with excellent mechanical properties, heat resistance, weatherability, color developing property and colorability, preferably as the acrylic resin (A), use is made of a methacrylic polymer with a principal structural unit derived from methyl methacrylate (sometimes referred to as "methyl methacrylate unit" hereinbelow) among those acrylic resins. The methacrylic polymer may be a homopolymer of methyl methacrylate, a copolymer of methyl methacrylate and an additional copolymerizable monomer (referred to as "methyl methacrylate copolymer") or a mixture thereof. As the methacrylic polymer, use is made of a methacrylic polymer with the content of the methyl methacrylate unit being preferably 50 to 100% by weight (abbreviated as "wt %" hereinafter) and more preferably 80 to 100 wt %.

When a methacrylic copolymer is used as the acrylic resin (A) in the polymer blend of the present invention, any unsaturated monomer copolymerizable with methyl methacrylate may be used with no specific limitation, including for example acrylic acid; metal acrylate salts; acrylate esters such as methyl acrylate, ethyl acrylate, n-butyl acrylate, s-butyl acrylate, and 2-butylhexyl acrylate; methacrylic acid; metal methacrylate salts; methacrylate esters such as ethyl methacrylate, n-butyl methacrylate, s-butyl methacrylate, t-butyl methacrylate, 2-hydroxyethyl methacrylate, glycidyl methacrylate and cycloglycyl methacrylate; acetate esters such as vinyl acetate; aromatic vinyl compounds such as styrene, α-methylstyrene, o-methylstyrene, m-methylstyrene, p-methylstyrene, 2,4-dimethylstyrene, and vinylnaphthalene; derivatives of maleic acid, such as maleic anhydride, maleate monoalkyl ester, and maleate dialkyl ester; maleimides such as N-phenylmaleimide; and the like. In such case, the methacrylic copolymer may contain a structural unit comprising one or two or more of the additional copolymerizable monomers described above.

From the respect of imparting the polymer blend with good moldability and making the acrylic resin exert its essential properties such as transparency and rigidity, preferably, the acrylic resin (A) should have a number average molecular weight of 100,000 or less. Taking account of the dispersibility in the block copolymer (B) and the miscibility with the polymer (C), then, the acrylic resin has a number average molecular weight of 10,000 to 80,000, more preferably.

The block copolymer (B) to be used in the polymer blend of the present invention is a block copolymer consisting essentially of a polymer block of a polymerized aromatic vinyl compound and/or a polymer block of a polymerized methacrylate monoester, and a polyolefin polymer block. The polymer block of a polymerized aromatic vinyl compound in the block copolymer (B) is a polymer block comprising a structural unit derived from an aromatic vinyl compound, including for example styrene, α-methylstyrene, o-methylstyrene, m-methylstyrene, p-methylstyrene, 2,4-dimethylstyrene, vinyl naphthalene, vinyl anthracene, 4-propylstyrene, 4-cyclohexylstyrene, 4-dodecylstyrene, 2-ethyl-4-benzylstyrene, and 4-(phenylbutyl)styrene. The polymer block of a polymerized aromatic vinyl compound may contain a structural unit comprising one or two or more of the monomers described above. Among them, preferably, the polymer block of a polymerized aromatic vinyl compound comprises a structural unit of styrene and/or α-methylstyrene.

The polymer block of a polymerized aromatic vinyl compound may sometimes contain a structural unit comprising an additional unsaturated monomer at a lesser amount.

The polymer block of a polymerized methacrylate monoester in the block copolymer (B) is a polymer block comprising a structural unit derived from methacrylate monoester. The methacrylate monoester includes for example methyl methacrylate, ethyl methacrylate, n-butyl methacrylate, isopropyl methacrylate, t-butyl methacrylate, 2-ethylhexyl methacrylate, lauryl methacrylate, cyclohexyl methacrylate, phenyl methacrylate, benzyl methacrylate, hydroxyethyl methacrylate, glycidyl methacrylate, diethylaminoethyl methacrylate, and trimethoxysilylpropyl methacrylate. The polymer block of a polymerized methacrylate monoester may contain a structural unit comprising one or two or more of the monomers described above. Among them, preferably, the polymer block of a polymerized methacrylate monoester comprises a structural unit of a methacrylate monoalkyl ester with one to 14 carbon atoms in the alkyl group; particularly preferably, the polymer block comprises a structural unit of methyl methacrylate.

Additionally, the polymer block of a polymerized methacrylate monoester may sometimes contain an additional unsaturated monomer at a lesser amount. The unsaturated monomer includes for example methacrylic acid; metal salts of methacrylates, such as sodium methacrylate; and methacrylamide.

The polyolefin polymer block in the block copolymer (B) may be a polymer block comprising a structural unit comprising one or two or more of olefin monomers such as ethylene, propylene, isobutylene and pentene; a polymer block comprising a polymer produced from one or two or more of conjugated diene compounds such as butadiene, isoprene, pentadiene and hexadiene or a polymer block produced by hydrogenating the polymer described above; or a polymer block comprising a copolymer of one or more of the olefin monomers described above and one or more of the conjugated diene compounds or a copolymer produced by hydrogenating the copolymer described above.

From the respect of ready availability in accordance with the present invention, specifically, the polyolefin polymer block is preferably a polymer block of at least one member selected from the group consisting of:

a) a polybutadiene polymer block with the content of 1,2-bonds less than 30 mol %, preferably 25 mol % or less, and a hydrogenated polybutadiene polymer block produced by hydrogenating the aforementioned polybutadiene polymer;

b) a polyisoprene polymer block comprising a structural unit of isoprene and a hydrogenated polyisoprene polymer block produced by hydrogenating the aforementioned polyisoprene polymer block;

c) a polymer block of an isoprene/butadiene copolymer comprising a structural unit of isoprene and butadiene, and a polymer block of a hydrogenated isoprene/butadiene copolymer produced by hydrogenating the aforementioned copolymer block; and d) a polyisobutylene polymer block comprising a structural unit of isobutylene.

When the polyolefin polymer block is the polybutadiene polymer block or the hydrogenated polybutadiene polymer block as described above in a)., 70 mol % or more, preferably 75 to 100 mol % of the structural unit of butadiene should be 2-butene-1,4-diyl group(—CH$_2$—CH═CH—CH$_2$—; butadiene unit with 1,4-bond) and 30 mol % or less, preferably 25 to 0 mol % thereof is vinyl ethylene group [CH(CH═CH$_2$)—CH$_2$—; butadiene unit with 1,2 bond].

When the polyolefin polymer block is the polyisoprene polymer block or the hydrogenated polyisoprene polymer block as described above in b)., the structural unit of isoprene at a state prior to hydrogenation may be one or two or more groups selected from the group consisting of 2-methyl-2-butene-1,4-diyl group [—CH$_2$—C(CH$_3$)═CH—CH$_2$—; isoprene unit with 1,4 bond], isopropenyl ethylene group [—CH[C(CH$_3$)═CH]—CH$_2$—; isoprene unit with 3,4 bond], and 1-methyl-1-vinyl ethylene group [—C(CH$_3$)(CH═CH$_2$)—CH$_2$—; isoprene unit with 1,2 bond].

When the polyolefin polymer block is the polymer block of the isoprene/butadiene copolymer or the polymer block of the hydrogenated isoprene/butadiene copolymer, as described above in c)., the structural unit of isoprene at a state prior to hydrogenation is one or two or more groups selected from the group consisting of 2-methyl-2-butene-1,4-diyl group, isopropenyl ethylene group and 1-methyl-1-vinyl ethylene group, and the structural unit of butadiene is 2-butene-1,4-diyl group and/or vinyl ethylene group. In the polymer block of the isoprene/butadiene copolymer or the polymer block of the hydrogenated isoprene/butadiene copolymer, the structural unit of butadiene and the structural unit of isoprene may be arranged in any form of random, block, taper form or a form with two or more forms thereof mixed therein.

When the polyolefin polymer block is a polymer block through hydrogenation as contained in those described in a) to c), the polyolefin polymer block is hydrogenated completely or partially. So as to impart the polyolefin polymer block, particularly the block copolymer (B) and the polymer blend of the present invention with excellent resistance to thermal deterioration and fine weatherability, 50% or more, particularly 80% or more of the carbon—carbon double bonds in the structural unit of butadiene and/or the structural unit of isoprene is preferably hydrogenated. More specifically, the unsaturated degree of the polyolefin polymer block after hydrogenation is preferably 50 mol % or less, particularly 20 mol % or less.

In the block copolymer (B), the block polymer of a polymerized aromatic vinyl compound, the polymer block of a polymerized methacrylate monoester and the polyolefin polymer block are bonded together, with no specific limitation (at any arrangement state), as long as the bonding thereof composes any block copolymer, satisfactorily including the block copolymer (B1) wherein the polymer block of a polymerized aromatic vinyl compound and the polyolefin polymer block are bonded together, the block copolymer (B2) wherein the polymer block of a polymerized methacrylate monoester and the polyolefin polymer block are bonded together, and the block copolymer (B3) wherein these three polymer blocks are bonded together. Specific examples thereof include block copolymers represented by the following general formulas (I) to (VIII);

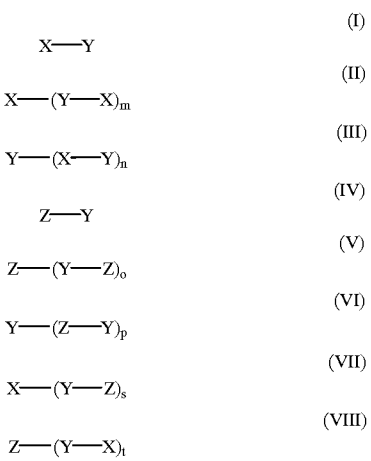

[wherein X represents a polymer block of a polymerized aromatic vinyl compound; Y represents a polymer block comprising the polyolefin polymer block; Z represents a polymer block comprising a methacrylate monoester; m, n, o, p and s independently represent for example an integer of 1 to 5; and t represents for example an integer of 2 to 5.]

Among them, preferably, the block copolymer (B) is the block copolymer represented by the aforementioned general formula (I) or (IV) and the block copolymer represented by the general formula (II), (III), (V), (VI) and (VII) wherein m through are independently 1, from the respect of ready production, ready availability and moldability of the block copolymer; more specifically, the block copolymer represented by the general formula (II) or (VII) wherein m or s is 1 is more preferably used from the respect of ready production and availability and the dispersibility of the copolymer in the acrylic resin (A) and the mechanical properties thereof.

In the block copolymer (B), preferably, the total content of the polymer block of a polymerized aromatic vinyl compound and the polymer block of a polymerized methacrylate monoester is 30 to 50 wt % and the content of the polyolefin polymer block is 97 to 50 wt %, from the respect of the resulting softness of the block copolymer (B), particularly the polymer blend; more preferably, the total content of the polymer block of a polymerized aromatic vinyl compound and the polymer block of a polymerized methacrylate monoester is 5 to 50 wt % and the content of the polyolefoin polymer block is 95 to 50 wt %. The polymer block of a polymerized aromatic vinyl compound and the polymer block of a polymerized methacrylate monoester are included together at any ratio, with no specific limitation.

From the respect of the moldability of the polymer blend and the dispersibility of the block copolymer (B) in the polymer blend, the block copolymer (B) has a number average molecular weight of 10,000 to 100,000.

The polymer blend of the present invention may contain only a single species of the block copolymer (B) or two or more species of the block copolymers (B).

The block copolymer (B) additionally may contain one or two or more functional groups such as hydroxyl group, carboxyl group, amino group, carboxylic group, and epoxy group, within the molecule and/or the ends, unless any of the effects of the present invention is deteriorated thereby.

Any method for producing the block copolymer (B) or any method for getting the block copolymer (B) may be used, with no specific limitation, as long as the block copolymer containing the polymer block of a polymerized aromatic vinyl compound and/or the polymer block of a polymerized methacrylate monoester and the polyolefin polymer block is available by the method. In other words, for the polymer blend of the present invention, the block copolymer (B) may be the one, produced or commercially available or available by other methods.

With no specific limitation, the block copolymer (B) is synthetically produced by living anionic polymerization, wherein the polyolefin polymer block is the polybutadiene polymer block or the hydrogenated polybutadiene polymer block as described in a)., the polyisoprene polymer block or the hydrogenated polyisoprene polymer block as described in b)., and the polymer block of the isoprene/butadiene copolymer or the polymer block of the hydrogenated isoprene/butadiene copolymer as described in c). For example, a block copolymer desirable can be produced by the following methods;

1. a polymerization method comprising sequentially adding and polymerizing monomers corresponding to the polymer block of a polymerized aromatic vinyl compound, the polymer block of a polymerized methacrylate monoester or the polyolefin polymer block, by using a polymerization initiator of alkyl monolithium such as methyl lithium, ethyl lithium, n-butyl lithium, sec-butyl lithium, tert-butyl lithium, and pentylbutyl lithium;
2. a polymerization method comprising sequentially adding and polymerizing monomers corresponding to the polymer block of a polymerized aromatic vinyl compound, the polymer block of a polymerized methacrylate monoester or the polyolefin polymer block, by using a polyfunctional polymerization initiator produced by anionizing a compound with two or more ethylenic unsaturated bonds within the molecule, such as 1,3-bis-(phenylethenyl) benzene, 1,3-diisopropenylbenzene, and divinylbenzene by using an appropriate alkyl lithium or a polyfunctional polymerization initiator produced by directly anionizing α-methylstyrene and diene compounds in the presence of alkali metal salts, wherein the polymerization is initiated at parts except for the terminal blocks of the block copolymer (B);
3. a method comprising promoting independently the independent living polymerization of the polymer block of a polymerized aromatic vinyl compound, the polymer block of a polymerized methacrylate monoester or the polyolefin polymer block, and subsequently adding a coupling agent such as chlorocyanate compounds to bond them together; and the like.

Generally, then, the block copolymer (B) containing the polymer block of a polymerized methacrylate monoester cannot be produced by a method comprising living anionic polymerization of the methacrylate monoester and subsequent addition of an olefin monomer, a diene monomer or an aromatic vinyl compound, because the method cannot progress block copolymerization. Therefore, the methods comprising sequential addition, as described above 1 and 2, should be carried out in the order of polymerization of an olefin monomer, a diene monomer or an aromatic vinyl compound and subsequent addition of a methacrylate monoester for polymerization to produce such block copolymer. Alternatively, 1,1-diphenylethylene is added to the reaction system, so as to add the 1,1-diphenylethylene to the end of the polymerization growth, prior to block copolymerization of a methacrylate monoester, whereby the nucleophilicity of carbanion as the end of the polymerization growth is controlled followed by addition of the methacrylate monoester.

The block copolymer of a polymerized methacrylate monoester, wherein the polymer block contains a monomer unit of methacrylic acid or the metal salt thereof can be produced by copolymerizing a desired polymethacrylate monoester polymer block and partially hydrolyzing the ester part thereof.

As the polymerization solvent to be used for the polymerization reaction for producing the block copolymer (B), use is made of any polymerization solvent, with no specific limitation, provided that the solvent never causes side reactions with the carbanion as the end of the polymerization growth for anionic polymerization. Specific examples thereof include saturated hydrocarbon solvents such as hexane, heptane, cyclohexane, and methyl cyclohexane; aromatic hydrocarbon solvents such as benzene, toluene, xylene, ethylbenzene, and tert-butylbenzene; etheric solvents such as tetrahydrofuran, diethyl ether, and anisole. For the block copolymer (B) containing a polymer block comprising a methacrylate monoester, preferably, use is made of aromatic hydrocarbon solvents or etheric solvents, from the respect of solubility.

For producing a polyolefin polymer block or a hydrogenated product thereof by anionic polymerization of an olefin monomer or a diene monomer, a vinylating agent may be added from the respect of the control of the micro-structure. Through the addition of a vinylating agent, the content of 1,2 bond or 1,4 bond in the unit of the diene monomer can be controlled, whereby the crystallizability of the hydrogenated polybutadiene polymer block as the polyolefin polymer block can be controlled. When the polyolefin polymer block is a polyisoprene polymer block or a hydrogenated polyisoprene polymer block, the glass transition temperature of the polyolefin polymer block can be elevated by the addition of a vinylating agent. Such vinylating agent includes for example ethers such as dimethyl ether, diethyl ether, and tetrahydrofuran; glycol ethers such as ethylene glycol dimethyl ether and diethylene glycol methyl ether; and amine compounds such as triethylamine, N,N,N', N'-tetramethylethylenediamine (TMEDA), and N-methyl morpholine.

The polymerization reaction for producing the block copolymer (B) may progress generally at an appropriate temperature, but when an etheric solvent is used as the solvent therefor or a methacrylate monoester should be polymerized, a temperature condition below 0° C. should preferably be adopted, and a temperature condition below −30° C. should more preferably be adopted, from the respect of suppression of side reactions.

For producing the block copolymer (B) by living anionic polymerization as described above, the end can be modified as a functional group by using a desired terminator for such modification, at the time when the polymerization of the block copolymer is terminated, by using the living anion at the end. The modification agent to be then used includes for example epoxy compounds such as ethylene oxide, propylene oxide, and styrene oxide; aldehyde compounds such as benzaldehyde; halogenated alkyls containing functional groups protected with trimethylsilyl group; and carbon oxides such as carbon monooxide and carbon dioxide.

Any conventionally known method for adding hydrogen to the unsaturated groups in the block copolymer produced by the polymerization described above may be used, with no specific limitation, but the method for adding molecular hydrogen in the presence of a hydrogenation catalyst may preferably be used. As the hydrogenation catalyst then, use is made of for example Raney nickel; Pt, Pd, Ru, Rh and Ni, immobilized onto carriers such as carbon, alumina and diatomite; and Ziegler catalysts using a transition metal in combination with an alkyl aluminium compound or an alkyl lithium compound. For the hydrogenation, for example, the hydrogen pressure should be within a range from ambient pressure to 200 kg/cm$^2$; the reaction temperature should be within a range from ordinary room temperature to 250° C.; and the reaction time should be within a range of 0.1 to 100 hours.

For recovery of the block copolymer (B) produced by the hydrogenation reaction, for example, a method comprising solidifying the reaction solution in methanol and heating or drying the resulting solidified product under reduced pressure, or a method comprising pouring the reaction solution into boiling water to subject the solvent to azeotropic reaction for removal, and subsequently heating or drying the resulting product under reduced pressure, can be adopted satisfactorily.

Any known method for producing the block copolymer (B) wherein the polyolefin block polymer is the polyisobutylene polymer block described in d) may be used, with no specific limitation.

For example, the following methods maybe used for producing the block copolymer (B).

(a) A method comprising polymerizing monomers comprising an aromatic vinyl compound and monomers comprising isobutylene in a step-wise manner, in an inactive solvent such as hexane and methylene chloride in the presence of an initiator system comprising a Louise acid and an organic compound forming an active species for cation polymerization together with the Louise acid and by using an additive such as pyridine derivatives and amides in combination, if necessary, to produce a diblock copolymer comprising a polymer block of a polymerized aromatic vinyl compound and polyisobutylene block.

(b) A method comprising firstly adding monomers comprising an aromatic vinyl compound into a polymerization system for first polymerization using as an initiator system an organic compound with one functional group and a Louise acid and adding monomers comprising isobutylene to the polymerization system for second polymerization after the first polymerization is substantially completed, and again adding the monomers comprising the aromatic vinyl compound to the polymerization system for third polymerization after the second polymerization is substantially terminated, to produce a triblock copolymer of a polymer block of a polymerized aromatic vinyl compound, a polyisobutylene polymer block and a polymer block of a polymerized aromatic vinyl compound.

(c) A method comprising polymerizing isobutylene using a bifunctional monomer and adding monomers comprising an aromatic vinyl compound into the polymerization system, to produce a triblock copolymer comprising a polymer block of a polymerized aromatic vinyl compound, a polyisobutylene polymer block and a polymer block of a polymerized aromatic vinyl compound.

The Lewis acid to be used for the method for producing the block copolymer (B) wherein the polyolefin polymer block is polyisobutylene, includes for example titanium tetrachloride, boron trichloride, aluminium chloride and stannic tetrachloride.

The organic compound forming an active species for cationic polymerization together with the Lewis acid, includes for example an organic compound with a functional group, such as alkoxy group, acyloxy group and halogen atom. More specifically, the organic compound includes for example bis(2-methoxy-2-propyl)benzene, bis(2-acetoxy-2-propyl)benzene, and bis(2-chloro-2-propyl)benzene.

The amides include for example dimethylacetoamide, and dimethylformamide.

The polymer blend of the present invention contains a third polymer (C) miscible with the acrylic resin (A) and immiscible with the block copolymer (B), along with the acrylic resin (A) and the block copolymer (B).

The term "miscible" represents a so-called thermodynamically miscible state of two or more different polymers mixed together at a monomer unit level. As described in "Polymer Blend—Miscibility and Surface—", CMC Co. Ltd., 2-nd edition, pp. 102–106 and pp. 136–137, issued Aug. 15, 1984 as a known reference, such miscible state can be confirmed that the blend has only a single glass transition temperature between the glass transition temperatures of the component polymers, as measured by DSC (differential scanning calorimeter) and dilatometry.

For producing the polymer blend comprising three polymers of the acrylic resin (A), the block copolymer (B) and the polymer (C) and having excellent softness by mixing given amounts of these three polymers, in accordance with the present invention, the type of the polymer (C) and the ratio of the acrylic resin (A) to the polymer (C) should be selected and determined, so that the absolute value ($|\eta_{AC}-\eta_B|$)of th difference between the refractive index $\eta_{AC}$ of the blend of the acrylic resin (A) and the polymer (C) and the refractive index $\eta_B$ of the block copolymer (B) might be 0.01 or less, the blend being produced by removing the block copolymer (B) from the polymer blend of the present invention.

For producing the polymer blend containing the three polymers of the acrylic resin (A), the block copolymer (B) and the polymer (C) by using "A" parts by weight of the acrylic resin (A), "B" parts by weight of the block copolymer (B) and "C" parts by weight of the polymer (C) in accordance with the present invention, the type of the polymer (C) and the ratio of the "A", "B" and "C" parts by weight of the acrylic resin (A), the block copolymer (B) and the polymer (C), respectively, should be selected and determined, so that the absolute value ($|\eta_{AC}-\eta_B|$) of the difference between the refractive index $\eta_{AC}$ of the blend produced by mixing and melt kneading together "A" parts by weight of the acrylic resin (A) and "C" parts by weight of the polymer (C) and the refractive index $\eta_B$ of the block copolymer (B) might be 0.01 or less.

When the absolute value ($|\eta_{AC}-\eta_B|$) of the difference between the refractive index $\eta_{AC}$ Of the blend produced by mixing and melt kneading together the acrylic resin (A) and the polymer (C) and the refractive index $\eta_B$ of the block copolymer (B) is above 0.01, the transparency of the resulting polymer is poor or lost, with the result that the optical transmittance is reduced, involving greater haze.

In accordance with the present invention, preferably, the absolute value ($|\eta_{AC}-\eta_B|$) of the difference in refractive index is preferably 0.008 or less.

In accordance with the present invention, examples of the polymer (C) to be used preferably in preparing the polymer blend with the absolute value ($|\eta_{AC}-\eta_B|$) of the difference in refractive index below 0.01 include styrene/acrylonitrile copolymer, styrene/maleic anhydride copolymer, polyvinylidene fluoride, phenoxy resin, polycarbonate, polyvinyl acetate, polyvinyl chloride, and polyethylene oxide. In accordance with the present invention, one or two or more thereof may be used as the polymer (C). Among them, preferably, use is made of styrene/acrylonitrile copolymer, phenoxy resin, styrene/maleic anhydride copolymer and polyvinylidene fluoride, from the respect of miscibility. From the respect of moldability, preferably, the polymer (C) preferably has a number average molecular weight of 500,000 or less.

The standard for selecting the polymer (C) satisfying the conditions for the difference in refractive index as described above will be described below, with no specific limitation. The polymer (C) and the acrylic resin (A) are melt mixed together at a weight ratio of 5/5 to prepare a blend, from which a test piece of a thickness of 3 mm is prepared. The total optical transmittance and haze value of the test piece should be 80% or more and 15% or less, respectively, when measured along the thickness direction at 20° C.; and the total transmittance and haze value thereof preferably should be 85% or more and 10% or less, respectively. A polymer blend with the absolute value ($|\eta_{AC}-\eta_B|$) of the difference in refractive index below 0.01 is readily prepared if such polymer (C) is then used.

Furthermore, the other standard is additionally described below. Provided that the refractive index of the acrylic resin (A) is $\eta_A$ and the refractive index of the block copolymer (B) is $\eta_B$ and $\eta_A<\eta_B$, an appropriate polymer selected from those with larger refractive indices than the refractive index $\eta_B$ of the block copolymer (B) is used as the polymer (C); provided $\eta_A>\eta_B$, an appropriate polymer selected from those with smaller refractive indices than the refractive index $\eta_B$ of the block copolymer (B) is used as the polymer (C). Then, a polymer blend with the absolute value ($|\eta_{AC}-\eta_B|$) of the difference in refractive index below 0.01 is readily prepared.

In accordance with the present invention, as has been described above, the types of the acrylic resin (A), the block copolymer (B) and the polymer (C) as well as the blend ratio thereof, should be determined while keeping the absolute value ($|\eta_{AC}-\eta_B|$) of the difference between the refractive index $\eta_{AC}$ of the blend produced by blending together the acrylic resin (A) and the polymer (C) at a given ratio and the refractive index $\eta_B$ of the polymer (C) below 0.01. Hence, the blend ratio of these three types of the polymers in the polymer blend of the present invention cannot be determined definitely but may be adjusted depending on the individual refractive indices of these polymers. The ratio should vary depending on the refractive indices of the individual polymers.

While keeping the absolute value ($|\eta_{AC}-\eta_B|$) of the difference in refractive index below 0.01, the ratio of the block copolymer (B) is 20 to 90 wt % and the total ratio of the acrylic resin (A), the polymer (C) and an additional component to be added if necessary is 80 to 10 wt % on the basis of the total weight of the polymer blend. Then, the block copolymer (B) forms a continuous phase in the polymer blend, so that the polymer blend can procure excellent transparency and more excellent properties such as softness and impact resistance. Preferably, the ratio of the block copolymer (B) is 30 to 90 wt %; more preferably, the ratio is 35 to 85 wt %.

The phrase "the block copolymer (B) forms a continuous phase" in the present specification means that the block copolymer is continous with no intermission along the vertical and crosswise directions of a cross sectional image of the polymer blend under electron microscopic observation. The polymer blend of such phase separation structure in accordance with the present invention can acquire enriched softness and a rubber hardness within a range of 50 to 90 as measured according to JIS K-6301 or a tensile elasticity within a range of 1 to 100 MPa.

As has been described above, the amounts of the acrylic resin (A), the block copolymer (B) and the polymer (C) to be blended together in the polymer blend of the present invention should be adjusted essentially, depending on the refractive indices of these individual polymers. For the polymer blend of the present invention, generally, the acrylic resin (A) is used at a ratio of 50 to 99 wt % and the polymer (C) is used preferably at a ratio of 50 to 1 wt % on the basis of the total weight of the acrylic resin (A) and the polymer (C), from the respect of the properties of the acrylic resin to be retained.

When a given amount of a third polymer except for the block copolymer (B) is melt kneaded into a given amount of the acrylic resin (A), whitening may eventually occur in the resulting product so that transparency is lost or reduced. Thus, it may sometimes be impossible to measure then the refractive index of the blend of the acrylic resin (A) and the third polymer, and in such case, absolutely, the absolute value ($|\eta_{AC}-\eta_B|$)of the difference in refractive index cannot be determined. Then, it is concluded that such third polymer of itself is not appropriate as the polymer (C) to be used in the polymer blend of the present invention or the use of the third polymer at the given ratio is not appropriate for producing the polymer blend of the present invention. Therefore, such third polymer is excluded from the scope of the present invention.

The polymer blend of the present invention may contain one or two or more additives such as reinforcing agents, fillers, pigments, coloring agents, flame retardants, ultraviolet absorbing agents, antioxidizing agents, antistatic agents, and releasing agents, if necessary, within a range without no occurrence of deterioration of the effects of the present invention. The polymer blend may also contain other polymers such as polyolefins.

The method for producing the polymer blend of the present invention is not specifically limited. Any conventionally known method for producing thermoplastic polymer blends may be used. For example, the polymer blend of the present invention may be produced by melt kneading the raw materials together by means of a single-screw extruder, a twin-screw extruder, a Banberry mixer and other common melt kneaders and further preparing the resulting product into pellets or other forms if necessary. For kneading, the three polymers, namely the acrylic resin (A), the block copolymer (B) and the polymer (C), may be mixed together and melt kneaded together or the three polymers are sequentially mixed together in an appropriate order to be then melt kneaded together. Otherwise, the acrylic resin (A) and the polymer (C) may be preliminarily melt kneaded together, into which is mixed the block copolymer (B) for melt kneading; or the acrylic resin (A) and the block copolymer (B) may be melt kneaded together preliminarily, into which is added the polymer (C) for subsequent melt kneading.

The polymer blend of the present invention may satisfactorily be used for utilities as film, sheet and various other molded articles. Common molding methods and molding systems for thermoplastic polymer blends may be used for producing these molded articles by using the polymer blend of the present invention. For example, injection molding, extrusion molding and press molding are carried out to produce various molded articles of an appropriate size and an appropriate dimension.

The polymer blend of the present invention can be used effectively for utilities such as automobile parts, electric and electronic parts, optical parts, building materials, and miscellaneous items, taking advantage of the excellent transparency, processability, weatherability, softness, colorability, and color developing property. So as to take advantage of the characteristic properties such as softness, resistance to light, color ability and color developing property, additionally, the polymer blend of the present invention may be added into other resins for use.

The present invention will now be described specifically in the following examples, but the invention is not limited to these examples. In the examples below, the following procedures were carried out so as to determine or observe the total optical transmittance and haze, refractive index, rubber hardness, tensile elasticity, the presence or absence of the phase continuity of the block copolymer and miscibility.

(1) Total optical transmittance and haze

The blend of the acrylic resin and the polymer (C) or the polymer blend, both in pellets, were injection molded at a cylinder temperature of 260° C. and a mold temperature of 30° C. by means of an injection molder (Type IS-80; manufactured by Toshiba, Co. Ltd.), to prepare test pieces of 8 cm (length)×8 cm (width)×3 mm (thickness). Then, the total optical transmittance and haze of the resulting test pieces along the thickness direction were measured at 20° C. with a direct reader haze computer (Type HGM-2DP; manufactured by Suga Test Instruments Co., Ltd).

(2) Refractive index

From the acrylic resin, the block copolymer, the polymer (C) or the blend of the acrylic resin and the polymer (C), test pieces of 8 cm (length)×8 cm (width)×3 mm (thickness) were prepared in the same manner as described above in (1). The refractive index thereof was measured at 20° C. by using a digital refractometer "RX-2000" manufactured by Atago Co.

(3) Rubber hardness

The rubber hardness of the polymer blend was measured according to JIS K-6301.

(4) Tensile elasticity

From the polymer blend, molded pieces of 10 cm (length)×10 cm (width)×3 mm (thickness) were prepared in the same manner as above in (1). From the aforementioned molded pieces, molded pieces of dumbbell No. 3 were punched out according to JIS K6301, so that the injection direction during molding might be vertical to the tensile direction, to prepare test pieces. According to the test conditions of JIS K6301, the tensile elasticity of the test pieces was measured by a tensile tester (Type Shimadzu autograph AG-5000D; manufactured by Shimadzu Corp.).

(5) Presence or absence of phase continuity in block copolymer

From the polymer blend, test pieces of 8 cm (length)×8 cm (width)×3 mm (thickness) were prepared in the same manner as above in (1). From the aforementioned test pieces, ultra-thin sections of a thickness of 80 nm were prepared by means of a cryoultramicrotome (Type FC-S; manufactured by Reihelt Co.). The ultra-thin sections were stained with ruthenium tetraoxide to dye the block copolymer in the ultra-thin sections, so as to observe the presence or absence of phase separation in the block copolymer under a transmission type electron microscope (TypeH-7100; manufactured by Hitachi, Ltd.). It was determined that the block copolymer formed a continuous phase when the copolymer formed a continuous phase along vertical and crosswise directions with no intermittence on cross sectional faces.

(6) Miscibility

The miscibility between the acrylic resin and the polymer (C) and the miscibility between the block copolymer and the polymer (C) were evaluated, by using the melt mixtures of these resins by means of DSC (Type DSC30; manufactured by Mettler Instruments Co.). Glass transition temperatures were measured in nitrogen at a temperature elevation rate of 10° C./min. The observation of the presence of a single glass transition temperature indicates that these polymers were miscible as marked with "○"; the observation of the presence of two or more glass transition temperatures indicates that these polymers were immiscible as marked with "x".

DESCRIPTION OF THE PREFERRED EMBODIMENTS

SYNTHETIC EXAMPLE 1

Production of acrylic resin A-1

Five-hundred parts by weight of pure water were charged in a polymerization reactor with a reflux condenser, followed by addition of a mixture solution of 425 parts by weight of methyl methacrylate, 55 parts by weight of methyl acrylate, 2.5 parts by weight of lauryl peroxide and 4 parts by weight of lauryl mercaptane. After the atmosphere was substituted with nitrogen under agitation, then, the temperature was raised to 80° C., for polymerization at that temperature for 2 hours and subsequent polymerization at 95° C. for one hour. The resulting product was washed in water and dried, to recover a bead-like acrylic resin (referred to as "acrylic resin A-1" hereinafter). The bead-like acrylic resin A-1 was measured by GPC. The number average molecular weight thereof on a polystyrene basis was 18,400 with a molecular distribution of 2.1. The refractive index of the acrylic resin A-1 was measured as 1.490.

SYNTHETIC EXAMPLE 2

Production of acrylic resin A-2

Five-hundred parts by weight of pure water were charged in a polymerization reactor with a reflux condenser, followed by addition of a mixture solution of 490 parts by weight of methyl methacrylate, 10 parts by weight of methyl acrylate, 2.5 parts by weight of lauryl peroxide and 4 parts by weight of lauryl mercaptane. After the atmosphere was substituted with nitrogen under agitation, then, the temperature was raised to 80° C., for polymerization at that temperature for 2 hours and subsequent polymerization at 95° C. for one hour. The resulting product was washed in water and dried, to recover a bead-like acrylic resin (referred to as "acrylic resin A-2" hereinafter). The bead-like acrylic resin A-2 was measured by GPC. The number average molecular weight thereof on a polystyrene basis was 19,000 with a molecular distribution of 2.0. The refractive index of the acrylic resin A-2 was measured as 1.491.

The contents, refractive indices and manufacturers of individual components to be used in the following examples will be described below.

Seps1:

A hydrogenated product of a triblock copolymer with a structure of polystyrene-polyisoprene-polystyrene (the styrene content in the block copolymer prior to hydrogenation was 30 wt %; the content of 1,4 bond in the polyisobutylene block prior to hydrogenation was 92% and the content of 3,4 bond therein was 8%; the number average molecular weight on a polystyrene basis was 35,100; the hydrogenation ratio of the polyisoprene block was measured on an iodine value basis, which was 93.2%; the refractive index was 1.506).

Seps2:

A hydrogenated product of a triblock copolymer with a structure of polystyrene-polyisoprene-polystyrene (the styrene content in the block copolymer prior to hydrogenation was 3 wt %; the content of 1,4 bond in the polyisobutylene block prior to hydrogenation was 94% and the content of 3,4 bond therein was 6%; the number average molecular weight on a polystyrene basis was 95,100; the hydrogenation ratio of the polyisoprene block was measured on an iodine value basis, which was 95.2%; the refractive index was 1.478).

Shvis:

A hydrogenated product of a triblock copolymer with a structure of polystyrene-polyisoprene-polystyrene (the styrene content in the block copolymer prior to hydrogenation was 30 wt %; the content of 1,4 bond in the polyisobutylene block prior to hydrogenation was 45% and the content of 3,4 bond therein was 55%; the number average molecular weight on a polystyrene basis was 90,000; the hydrogenation ratio of the polyisobutylene block was measured on an iodine value basis, which was 85%; the refractive index was 1.512).

Seeps—OH:

A hydrogenated product of a triblock copolymer with a structure of polystyrene-isoprene/1,3-butadiene copolymer-polystyrene and with a hydroxyl group on the single end (the styrene content in the block copolymer prior to hydrogenation was 30 wt %; the molar ratio of the isoprene unit to the 1,3-butadiene unit in the isoprene/1,3-butadiene copolymer block was 1/1; the number average molecular weight on a polystyrene basis was 40,000; the hydrogenation ratio of the isoprene/1,3-butadiene copolymer block was measured on an iodine value basis, which was 95%; the content of 1,4 bond in the entire isoprene units was 95%; the content of 3,4 bond therein was 5%; the hydroxyl content per one molecule of the triblock copolymer was 0.8; the refractive index was 1.505).

Sibus:

A triblock copolymer with a structure of polystyrene-polyisobutylene-polystyrene (the styrene content was 30 wt %; the number average molecular weight on a polystyrene basis was 34,000 and the molecular distribution was 1.23; the refractive index was 1.533).

Sim:

A triblock copolymer with a structure of polystyrene-polyisoprene-poly(methyl methacrylate) (the styrene content was 13 wt %; the content of isoprene was 74 wt %; the content of methyl methacrylate was 13 wt %; the number average molecular weight on a polystyrene basis was 69,000; the molecular distribution was 1.04; the refractive index was 1.528).

Phenoxy resin:

Type YP-50, manufactured by Tohto Kasei Co., Ltd. (refractive index of 1.598).

AS resin (1):

Acrylonitrile/styrene copolymer (refractive index of 1.573)(Type Raitack A930PC, manufactured by Mitsui Toatsu Chemicals Inc.)

AS resin (2):

Acrylonitrile/styrene copolymer (refractive index of 1.561)(Type Raitack A330PC, manufactured by Mitsui Toatsu Chemicals Inc.)

Pvdf:

Polyvinylidene fluoride (refractive index of 1.421) (Type KF polymer KF#1000, manufactured by Kureha Chemical Industry Co., Ltd.)

Example (1) The acrylic resin A-1 or acrylic resin A-2 was used as the acrylic resin A. The phenoxy resin and one of the AS resin (1), AS resin (2) and PVDF were mixed together at ratios shown below in Table 1, and the resulting mixtures were melt kneaded at 240° C. by means of a twin-screw extruder (TEX44C, manufactured by The Japan Steel Works Ltd.) to prepare pellets. Using an injection molding machine (IS-80, manufactured by Toshiba, Corp.), test pieces of 8 cm (length)×8 cm (width)×3 mm (thickness) were prepared from the resulting pellets, at a cylinder temperature of 260° C. and a mold temperature of 30° C. The refractive index of each of the blends was measured by the method described above. The results are shown below in Table 1.

The total optical transmittance and haze of the test pieces obtained in (1). were measured by the methods described above. The miscibility of these blends was also observed by the method described above. The results are shown below in Table 1.

TABLE 1

| | | | | Properties of blends[1] | | | |
|---|---|---|---|---|---|---|---|
| | Blend composition | | | Total | | | |
| | Acrylic resin (A) | | Polymer (C) | | optical | | |
| Experimental No. | type | weight (parts by weight) | type | weight (parts by weight) | transmittance (%) | Haze (%) | Miscibility | Refractive index ($\eta_{AC}$) |
| 1 | A1 | 83 | AS resin (1) | 17 | 90 | 2.4 | o | 1.504 |
| 2 | A1 | 83 | AS resin (1) | 17 | 90 | 2.4 | o | 1.504 |
| 3 | A1 | 76 | AS resin (1) | 24 | 89 | 2.5 | o | 1.511 |
| 4 | A1 | 84 | AS resin (1) | 16 | 90 | 2.4 | o | 1.509 |
| 5 | A1 | 51 | AS resin (1) | 49 | 89 | 2.7 | o | 1.533 |
| 6 | A1 | 57.5 | AS resin (1) | 42.5 | 89 | 2.6 | o | 1.529 |
| 7 | A1 | 77 | PVDF | 23 | 88 | 2.5 | o | 1.478 |
| 8 | A2 | 86 | Phenoxy resin | 14 | 90 | 1.6 | o | 1.504 |
| 9 | A1 | 83 | AS resin (1) | 17 | 90 | 2.4 | o | 1.504 |
| 10 | A1 | 100 | — | 0 | 92[2] | 0.7[2] | o[2] | 1.491[2] |
| 11 | A2 | 70 | Phenoxy resin | 30 | 89 | 1.7 | o | 1.523 |
| 12 | A1 | 83 | AS resin (2) | 17 | 75 | 46.5 | x | —[3] |

[1] properties of the melt kneaded product of acrylic resin (A) and polymer (C) with no block copolymer contained therein, among polymer blends
[2] measured values of acrylic resin (A) of itself
[3] refractive index not measurable because of the blend of acrylic resin (A) and polymer (C) at a whitened state (2) Alternatively, an additional experiment was done other than the experiment described in (1). The acrylic resin A-1 or acrylic resin A-2 was used as the acrylic resin A. One of SEPS 1, SEPS 2, SHBIS, SEEPS—OH, SIBUS and SIM as a block copolymer were used. Along with or without one of the phenoxy resin, AS resin (1), AS resin (2) and PVDF, the aforementioned materials were mixed together at ratios shown below in Table 2, and the resulting mixtures were melt kneaded at 240° C. by means of a twin-screw extruder (TEX44C, manufactured by The Japan Steel Works, Ltd.) to prepare pellets. Using an injection molder (IS-80, manufactured by Toshiba, Corp.), test pieces of 8 cm (length)×8 cm (width)×3 mm (thickness) and 10 cm×10 cm×3mm were individually prepared from the pellets, at a cylinder temperature of 260° C. and a mold temperature of 30° C.

TABLE 2

| Experimental No. | Acrylic resin (A) type | Acrylic resin (A) weight (parts by weight) | Block copolymer type | Block copolymer weight (parts by weight) | Polymer (C) type | Polymer (C) weight (parts by weight) |
|---|---|---|---|---|---|---|
| 13 | A1 | 83 | SEPS1 | 100 | AS resin (1) | 17 |
| 14 | A1 | 83 | SEPS1 | 400 | AS resin (1) | 17 |
| 15 | A1 | 76 | SHVIS | 100 | AS resin (1) | 24 |
| 16 | A1 | 84 | SEEPS-OH | 100 | AS resin (1) | 16 |
| 17 | A1 | 51 | SIBUS | 100 | AS resin (1) | 49 |
| 18 | A1 | 57.5 | SIM | 100 | AS resin (1) | 42.5 |
| 19 | A1 | 77 | SEPS2 | 100 | PVDF | 23 |
| 20 | A2 | 86 | SEPS1 | 100 | Phenoxy resin | 14 |
| 21 | A1 | 83 | SEPS1 | 10 | AS resin (1) | 17 |
| 22 | A1 | 100 | SEPS1 | 100 | — | 0 |
| 23 | A2 | 70 | SEPS1 | 100 | Phenoxy resin | 30 |
| 24 | A1 | 83 | SEPS1 | 100 | AS resin (2) | 17 |

The total optical transmittance and haze, rubber hardness and tensile elasticity of the test pieces were measured by the methods described above. The presence or absence of phase separation in the block copolymer was also observed by the method described above. The results are shown below in Table 3.

The value of $|\eta_{AC}-\eta_B|$ was determined from the results of (1), which is shown concurrently in Table 3. The block copolymers and the polymers (C) were absolutely immiscible, as marked with ×.

TABLE 3

| Experimental No. | $|\eta_{AC} - \eta_B|$ | Total optical transmittance (%) | Haze (%) | Rubber hardness (JIS hardness A) | Tensile elasticity (MPa) | State of continuous phase |
|---|---|---|---|---|---|---|
| 13 | 0.002 | 90 | 1.9 | 77 | 23 | Continuous |
| 14 | 0.002 | 89 | 3.5 | 74 | 15 | Continuous |
| 15 | 0.001 | 90 | 2.5 | 79 | 24 | Continuous |
| 16 | 0.004 | 90 | 2.7 | 76 | 22 | Continuous |
| 17 | 0.000 | 88 | 4.2 | 74 | 16 | Continuous |
| 18 | 0.001 | 87 | 3.7 | 63 | 19 | Continuous |
| 19 | 0.000 | 89 | 2.2 | 73 | 5 | Continuous |
| 20 | 0.002 | 87 | 3.1 | 77 | 25 | Continuous |
| 21 | 0.002 | 90 | 2.3 | 98 | 258 | Not continuous |
| 22 | 0.015 | 81 | 19 | 84 | 29 | Continuous |
| 23 | 0.017 | 58 | 36 | 78 | 27 | Continuous |
| 24 | —[2] | 66 | 64 | 80 | 28 | Continuous |

1) properties of the polymer blend of acrylic resin (A), block copolymer and polymer (C)
2) value of $|\eta_{AC}-\eta_B|$ not measurable because the refractive index $\eta_{AC}$ of the blend of acrylic resin (A) and polymer (C) could not be measured.

From the results shown in Tables 1 to 3, polymer blends of Experimental Nos. 13 to 21, produced by blending the acrylic resin (A), the block copolymer (B), and the polymer (C) miscible with the acrylic resin (A) but immiscible with the block copolymer (B), at a ratio such that the absolute value $(|\eta_{AC}-\eta_B|)$ of the difference between the refractive index $\eta_{AC}$ of the blend of the acrylic resin (A) and the polymer (C) and the refractive index $\eta_B$ of the block copolymer B might be 0.01 or less, have extremely large total optical transmittance with lesser haze, so the resulting blends are excellent in terms of transparency.

Among the polymer blends of the experimental Nos. 13 to 21, the polymer blends of experimental Nos. 13 to 20 wherein the acrylic resin (A), the block copolymer (B) and the polymer (C) were blended together so that the continuous phase of the block copolymer (B) might be formed, were excellent additionally in terms of smaller rubber hardness and excellent softness.

The polymer blends of Experimental Nos. 22 and 23 wherein the absolute value of the difference between the refractive index $\eta_{AC}$ of the blends of the acrylic resin (A) and the polymer (C) and the refractive index $\eta_B$ of the block copolymer (B) is above 0.01 and the polymer blend of experimental No. 24 wherein the blend of the acrylic resin (A) and the polymer (C) was already whitened had lower total optical transmittance and higher haze, with the resultant poor transparency.

As has been described above, the polymer blend of the present invention produced by blending together the acrylic resin (A), the block copolymer (B) and the polymer (C) miscible with the acrylic resin (A) and immiscible with the block copolymer (B) so that the absolute value $|\eta_{AC}-\eta_B|$ of the difference between the refractive index $\eta_{AC}$ of the blends of the acrylic resin (A) and the polymer (C) and the refractive index $\eta_B$ of the block copolymer (B) might be below 0.01 shows excellent transparency and softness, together with fine processability, weatherability, color developing potency, and colorability, and therefore, taking advantage of these properties, the polymer blend of the present invention can be used for various utilities including various molded articles. Additionally, the polymer blend is added to other resin materials to modify the properties of these resin materials.

When the three polymers are blended together so that the continuous phase of the block copolymer can be formed in the resulting polymer blend, in accordance with the present invention, the polymer blend can procure far excellent softness in addition to the properties described above.

What is claimed is:

1. A polymer blend with good softness comprising:
   (A) an acrylic resin having a methyl methacrylate unit content ranging from 80 to 100% by weight;
   (B) A block copolymer consisting essentially of a polymer block of a polymerized aromatic vinyl compound and/or a polymer block of a polymerized methacrylate monoester and a polyolefin polymer block; and
   (C) at least one polymer selected from the group consisting of styrene/acrylonitrile copolymer, a phenoxy resin and a styrene/maleic anhydride copolymer miscible with acrylic resin (A) and immiscible with block copolymer (B), wherein the absolute value $(|\eta_{AC}-\eta_B|)$ of the difference between the refractive index $(\eta_{AC})$ of the blend of the acrylic resin (A) and the polymer (C) and the refractive index (ROB) of the block copolymer (B) is 0.01 or less; and
   wherein said blend is obtained by melt mixing of components (A), (B) and (C).

2. A polymer blend according to claim 1, wherein the block copolymer (B) forms a continuous phase.

3. A polymer blend according to claim 1, containing the block copolymer (B) at a ratio of 20 to 90% by weight on the basis of the total weight of the polymer blend.

4. A polymer blend according to claim 1, containing the block copolymer (B) at a ratio of 30 to 90% by weight on the basis of the total weight of the polymer blend.

5. A polymer blend according to claim 1, wherein the rubber hardness measured by JIS K-3101 is within a range of 50 to 90 or the tensile elasticity measured by JIS K-3101 is within a range of 1 to 100 MPa.

6. A polymer blend according to claim 1, comprising 70 to 10% by weight of the total weight of the acrylic resin (A) and the polymer (C) and 30 to 90% by weight of the block copolymer (B) and containing the acrylic resin (A) at a ratio of 50 to 99% by weight and the polymer (C) at a ratio of 50 to 1% by weight on the basis of the total weight of the acrylic resin (A) and the polymer (C).

7. A polymer blend according to claim 1, wherein the number average molecular weight of the acrylic resin (A) is 10,000 to 80,000.

8. A polymer blend according to claim 1, wherein the block copolymer (B) is a triblock copolymer represented by the formula X—Y—X wherein X is a polymer block of a polymerized aromatic vinyl compound; and Y is a polyolefin polymer block.

9. A polymer blend according to claim 1, wherein the block copolymer (B) is a triblock copolymer represented by the formula X—Y—Z wherein X is a polymer block of a polymerized aromatic vinyl compound; Y is a polyolefin polymer block; and Z is a polymer block of a polymerized methacrylate monoester.

10. A polymer blend according to claim 1, wherein the block copolymer (B) is hydrogenated.

11. A molded article comprising a polymer blend according to claim 1.

12. A polymer blend according to claim 1, wherein the block copolymer (B) consists of the defined polymer blocks.

13. A polymer blend according to claim 12, wherein the block copolymer (B) is a triblock copolymer represented by the formula X—Y—X wherein X is a polymer block of a polymerized aromatic vinyl compound; and Y is a polyolefin polymer block.

14. A polymer blend according to claim 12, wherein the block copolymer (B) is a triblock copolymer represented by the formula X—Y—Z wherein X is a polymer block of a polymerized aromatic vinyl compound; Y is a polyolefin polymer block; and Z is a polymer block of a polymerized methacrylate monoester.

15. A polymer blend according to claim 1, wherein the copolymer (B) is of the formula:

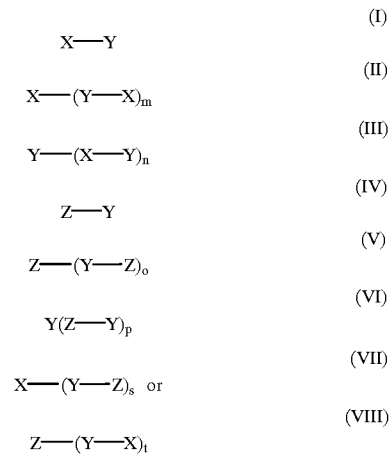

wherein X represents a polymer block of a polymerized aromatic vinyl compound; Y represents a polyolefin polymer block; Z represents a polymer block of a methacrylate monoester; m, n, o, p and s independently represent an integer of 1 to 5; and t represents an integer of 2 to 5.

16. A polymer blend according to claim 15, wherein the block copolymer (B) consists of the defined polymer blocks.

17. A polymer blend according to claim 1, wherein the block copolymer (B) is prepared solely by living anionic polymerization of the defined polymer blocks.

18. A polymer blend according to claim 12, wherein the block copolymer (B) is prepared solely by living anionic polymerization of the defined polymer blocks.

* * * * *